July 7, 1953
F. L. EBEL ET AL
2,644,939
VISIBLE INDICATOR
Filed July 25, 1950
2 Sheets-Sheet 1
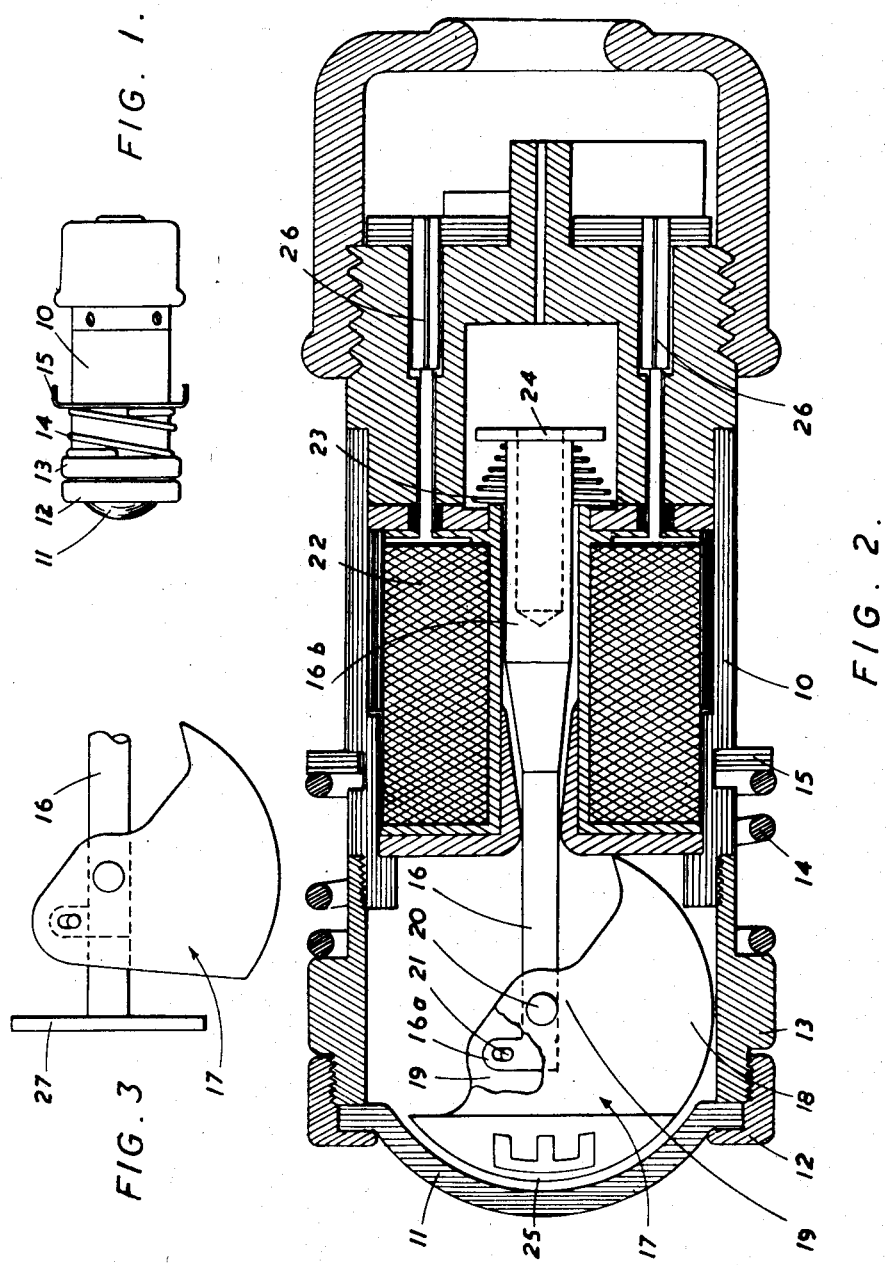
Inventors
FRANCIS LEONARD EBEL,
ALBERT JOHN MAISEY
By Robert B Pearson
Attorney July 7, 1953  F. L. EBEL ET AL  2,644,939
VISIBLE INDICATOR
Filed July 25, 1950  2 Sheets-Sheet 2
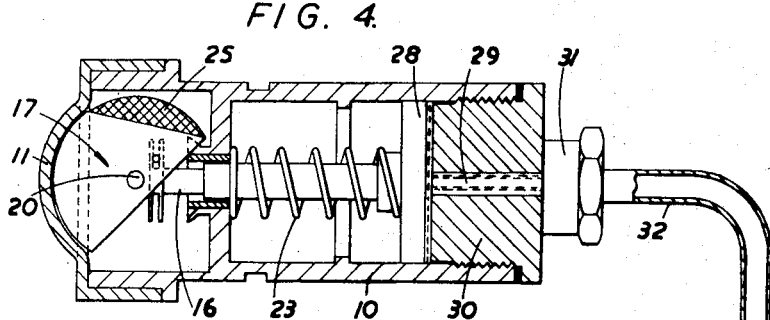
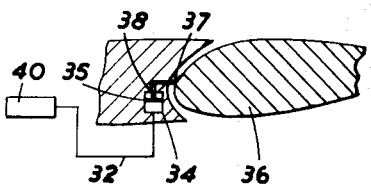
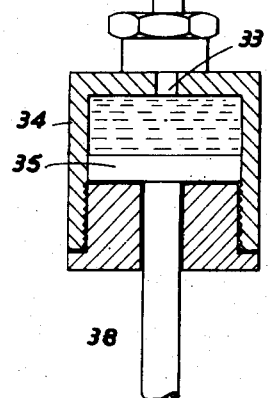
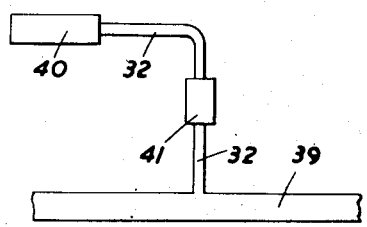
Inventors
FRANCIS LEONARD EBEL,
ALBERT JOHN MAISEY,
By Robert B Pearson
Attorney Patented July 7, 1953

2,644,939

UNITED STATES PATENT OFFICE 2,644,939

VISIBLE INDICATOR

Francis Leonard Ebel, Stanmore, and Albert John Maisey, Southall, England, assignors to The Fairey Aviation Company Limited, Hayes, England Application July 25, 1950, Serial No. 175,826
In Great Britain August 23, 1949

6 Claims. (Cl. 340—373)

1

This invention relates to visible indicators of the type in which a window is arranged to display a warning legend or other such indicating means when predetermined conditions are attained.

According to the invention a visible indicator comprises a window, an indicator plate behind the window movable from an obscured to a displayed position, and a shield pivotally mounted behind the window and movable relatively thereto from an obscuring to an inoperative position by an axially movable rod having an offset lug pivotally attached to the shield.

The indicator plate may be secured to, and pivotable with, the shield, or alternatively may be secured to, and movable axially with, the axially movable rod.

The means to move the rod axially may be electrical, e. g. solenoid means, or they may be mechanical, e. g. hydraulic or pneumatic, operated by a piston or a diaphragm, with or without intervening linkage, or screw or spring operated, according to the nature of the condition which it is desired shall be indicated.

Embodiments of the invention will be described with reference to the accompanying drawings, in which:

Figure 1 is a side elevation of a solenoid-operated indicator.

Figure 2 is a sectional side elevation of the indicator, to an enlarged scale, and Figure 3 is a fragmentary diagrammatic representation of an alternative embodiment.

Figure 4 is a diagrammatic representation of a fluid-operated system, including a sectional side elevation of an indicator.

Figure 5 is a diagrammatic representation of another fluid-operated system, actuated by a control surface, and Figure 6 is a diagrammatic representation of a further system.

Referring to Figures 1 and 2, in one example of the invention, for use on an aircraft dashboard, to give warning, e. g., of an outbreak of fire in an engine, the indicator consists of a cylindrical body 10, having at one end a part-spherical window 11 of uniform thickness, retained by a bezel 12 secured to an extension 13 of the body 10, the window 11 being arranged to be mounted in the dashboard (not shown) and the body 10 secured by a spring 14 and a ring 15 bearing against the dashboard. Slidable axially in the cylindrical body 10 is a rod 16, the front end of which is formed with an offset lug 16a extending radially. Just behind

2 the window 11 is a shield 17 comprising a part-spherical surface 18 having two parallel ears 19 extending in longitudinal planes and mounted on coaxial transversely extending pivots 20 projecting from the sides of the interior of the body extension 13, the location of the pivots 20 being such that the shield 17 is rotatable thereon through about 90° from a position immediately behind the window 11, in which it obscures the window, to the position shown in Figure 2, at the side of the interior of the body extension 13. For this purpose there extends across the shield 17 a transverse pin 21 which passes through an aperture in the offset lug 16a on the forward end of the axial rod 16. Axial movement of the rod 16 causes the shield to be swung on its pivots from one position to the other. The after end 16b of the rod 16 constitutes an armature for a solenoid winding 22 within the body, and a spring 23 is provided to abut against a flange 24 on the armature 16b and so maintain the rod and the shield 17 in the inoperative position when the solenoid is not energized.

An indicator plate 25 is constituted by an extension of the part-spherical surface 18 of the shield 17, and is arranged to be located immediately behind the window 11 and visible therethrough when the shield 17 is in its lateral position shown in Figure 2.

The plate 25 is coloured and bears the word "Fire." The solenoid winding 22 is connected by connectors 26 with an electric circuit arranged to be closed, so that the solenoid 22, 16b is energized, by a suitable known temperature-responsive switch or other device.

On energization of the solenoid 22, 16b due to the prevalence of the condition of which warning is to be given, the armature 16b is drawn forward, causing the shield 17 to be pivoted about the pivots 20 from its obscuring position behind the window 11 to the lateral position shown in Figure 2, and the indicator plate 25 to be swung to a position immediately behind the window 11, through which the legend may be read. On de-energization of the solenoid 22, 16b the spring 23 returns the rod 16 to its rear position, and the shield 17 returns to its obscuring position.

In an alternative embodiment shown in Figure 3 the construction is the same, except that an indicator plate 27, instead of being attached to the shield 17, is secured to the forward end of the axial rod 16. In the inoperative position the shield 17 is immediately behind and obscuring the window, and the indicator plate 27 is behind the shield, with the rod 16 in its rearmost position under the action of the spring 23. When the solenoid 22, 16b is energized the rod 16 and indicator plate 27 move forward and the shield 17 is swung laterally out of the way, as shown in Figure 3, allowing the indicator plate 27 to be read through the window, towards which it has advanced.

Referring to Figure 4, the shield 17 is mounted as before behind the window 11, and the rod 16 is normally held in its rearmost position by the spring 23. At the rear end of the rod 16 is a piston 28 slidable within the interior of the body 10, and the rear face of the piston 28 is exposed to fluid led into a passage 29 in a plug 30 at the rear end of the body 10, the plug 30 being connected by a gland nut 31, with one end of a pipe 32, the other end of which is connected, via a passage 33, with a chamber 34 in which is a piston 35 operable by simple mechanical motion derived from the component in relation to which the indicator is required to operate.

The operation of the device is simple. Movement of the piston 35 to expel the fluid from the chamber 34 causes corresponding movement of the piston 28 to move the rod 16 forward and operate the indicator as hereinbefore described. The dimensions of the pistons 28, 35 and associated parts are so arranged, as will be apparent to those skilled in the art, that the available mechanical motion of the component in relation to which the indicator is required to operate will produce the correct travel of the piston 28 to actuate the shield 17.

Figure 5 shows diagrammatically the operation of the indicator by an aircraft control surface 36. To this control surface is secured a lever arm 37 arranged to bear on a rod 38 attached to the piston 35 (see also Figure 4) in the chamber 34, which is connected by the pipe 32 with an indicator 40.

Other mechanical applications are derived, for example, from an aircraft undercarriage or from flaps, to indicate the position thereof.

Figure 6 shows a system operated solely by fluid pressure from a pressure line 39, with a reducing valve 41 in the branch 32 serving the indicator 40. When the pressure in the pressure line 39 is sufficient to operate the reducing valve, the indicator 40 is operated in the same manner as hereinbefore described with reference to the piston 28 of Figure 4.

We claim:

1. A visible indicator comprising, a window, an indicator plate located behind the window and movable from a blocked position away from said window to a displayed position so close to said window as to render said indicator readily visible therethrough, a shield, pivotal mountings for said shield behind the window enabling the shield to move from a position immediately adjacent the rear of said window in which said shield blocks said window to a lateral position relatively to said window when said indicator plate is in its displayed position in which said shield permits said indicator plate to be visible through said window, an axially movable rod, means coordinating the above-mentioned movements of said shield and indicator plate means, means for moving said rod axially toward said window, an offset lug at the forward end of said rod engaging the shield pivotally, and spring return means for said axial rod.

2. A visible indicator as claimed in claim 6, wherein the indicator plate is secured to, and pivotable with, the shield.

3. A visible indicator as claimed in claim 6, wherein the indicator plate is secured to, and movable axially with, the axially movable rod.

4. A visible indicator as claimed in claim 6, wherein said rod moving means comprises a solenoid winding and a solenoid armature movable axially therein and connected with the axially movable rod.

5. A visible indicator as claimed in claim 6, wherein said rod moving means comprises means forming a chamber and a fluid-operable piston slidable therein and connected with the axially movable rod.

6. A visible indicator comprising, a window, an indicator plate behind said window and movable from an obscured to a displayed position, a shield pivotally mounted about an axis behind the window and movable relatively thereto from an obscuring to an inoperative position, a rod axially movable along a line at right angles to said window and intersecting said axis at right angles, an offset lug on said rod pivotally attached to said shield, said plate being attached to the assembly comprising said rod and said shield, and a motor operative to move said rod along said axis, thereby actuating said plate and said shield to move said plate from obscured to displayed positions while moving said shield from obscuring to inoperative positions respectively.

FRANCIS LEONARD EBEL.
ALBERT JOHN MAISEY.

References Cited in the file of this patent

UNITED STATES PATENTS

| Number | Name | Date |
|---|---|---|
| 878,112 | Brackett | Feb. 4, 1908 |
| 2,245,493 | Nothe | June 10, 1941 |
| 2,388,448 | Sundt et al. | Nov. 6, 1945 |
| 2,450,441 | Mitchell | Oct. 5, 1948 |